March 3, 1942.  H. V. NEISS ET AL  2,274,727

SCRIBING AND CUTTING DEVICE

Filed Dec. 28, 1938  3 Sheets-Sheet 1

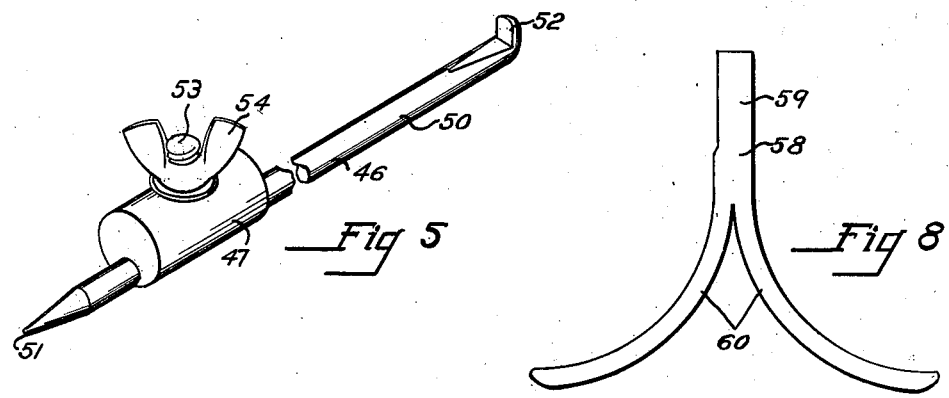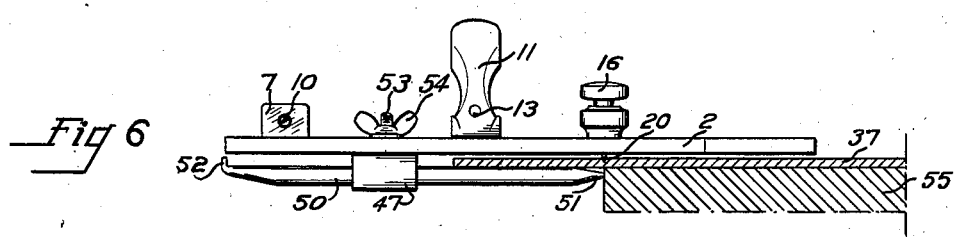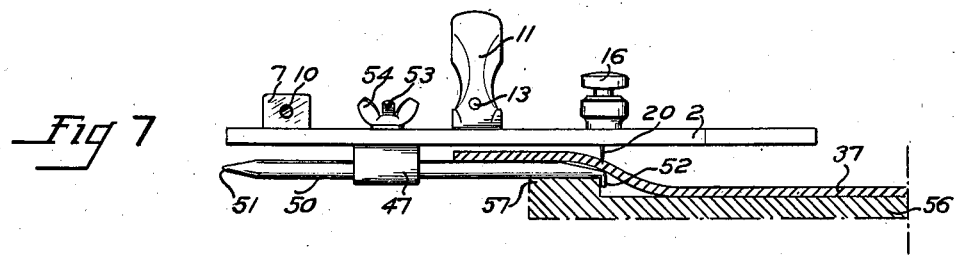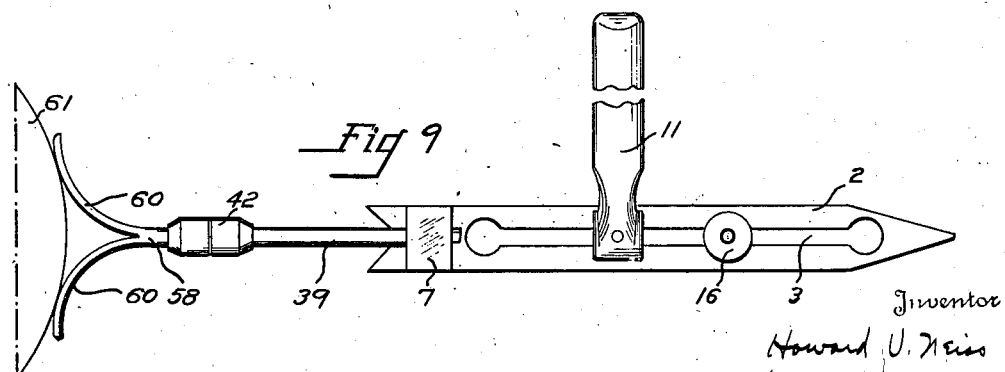

March 3, 1942. H. V. NEISS ET AL 2,274,727
SCRIBING AND CUTTING DEVICE
Filed Dec. 28, 1938 3 Sheets-Sheet 3
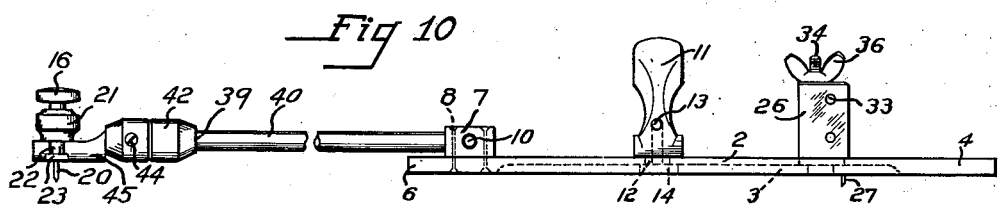
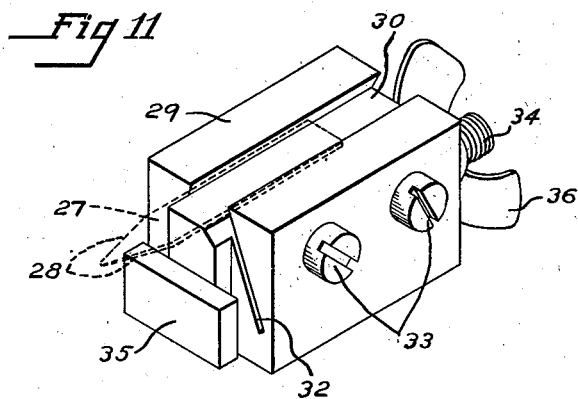
Inventor
Howard V. Neiss
Walter E. Etter
by
Walter & Kaufman
Attorney Patented Mar. 3, 1942

2,274,727

UNITED STATES PATENT OFFICE 2,274,727

SCRIBING AND CUTTING DEVICE

Howard V. Neiss and Walter E. Etter, Lancaster, Pa., assignors to Armstrong Cork Company, Lancaster, Pa., a corporation of Pennsylvania Application December 28, 1938, Serial No. 248,030

9 Claims. (Class 33—42)

This invention relates to scribing and cutting devices and, more particularly, to a universal scribing and cutting device for use in the installation of hard surface floor or wall coverings such as linoleum, felt base, "Linowall" or rubber coverings. It will be understood use of the device is not confined to the installation of hard surface coverings since it may be employed satisfactorily in the installation of other forms of floor coverings.

The chief object of this invention is to provide an economical and efficient universal scribing and cutting device for use in the installation of hard surface coverings. An object of our invention is to provide a universal device which can be used satisfactorily in the multifarious scribing and cutting duties required in the installation of linoleum, felt base, or similar types of hard surface floor or wall coverings. A further object is to provide an efficient, readily operable device for scribing or cutting small or large circles in the installation of linoleum.

A still further object is to provide an accurate, economical device for scribing or cutting linoleum adjacent an arcuate surface so that the cut surface presents substantially the same contour as such surface. A still further object is to provide a device for cutting or scribing linoleum adjacent a recessed surface so that the cut linoleum may be fitted accurately in the recess. A still further object is to provide a device for scribing or cutting linoleum adjacent a perpendicular surface to permit desired installation of borders around a field or similar uses.

This invention relates to a scribing device adapted for use in laying surface coverings comprising a frame having an opening extending longitudinally thereof, one end of said frame terminating in a point adapted to be placed against a surface from which a line is to be scribed, the opposite end of said frame terminating in two spaced points adapted to be placed against an arcuate surface from which a line is to be scribed having substantially the same contour as such surface, and an adjustable scribing pin mounted on said frame, the point of said pin extending through the opening in said frame.

This invention further relates to a cutting and scribing device adapted for use in laying surface coverings comprising a frame, an adjustable center pin, means securing said pin to said frame, a blade having cutting edges, and means securing said blade to said frame in spaced relationship to said pin so that the plane including its cutting edges is perpendicular to a line which passes through the blade and said pin and is perpendicular to each of them.

This invention further relates to a scribing device adapted for use in laying surface coverings comprising a frame, an adjustable scribing pin, means securing said pin to said frame, a rod having a rounded end adapted to be placed against a perpendicular surface outlining a line to be scribed, and means securing said rod to said frame in spaced relationship to said pin.

This invention further relates to the combination with a cutting or scribing device having a scribing pin in position thereon, of a rod terminating in two separate rounded legs adapted to be placed against an arcuate surface from which a line is to be scribed or cut thereby affording engagement at more than one point with such surface, and means securely holding said rod in spaced relationship to said pin.

The attached drawings illustrate a preferred embodiment of our invention, in which Figure 1 is a view in elevation of the device equipped for cutting circles;

Figure 4 is an isometric view of an extension rod adapted to be connected to the device;

Figure 5 is an isometric view of the rod and rod holder which is used for recess scribing;

Figure 6 is a view in elevation of the device used in the installation of linoleum on a counter surface;

Figure 7 is a view in elevation of the device used in the installation of linoleum in a recessed surface;

Figure 8 is a plan view of the forked rod employed for the purpose of scribing or cutting a line in linoleum adjacent an arcuate surface so that the scribed or cut line presents substantially the same contour as such surface;

Figure 9 is a plan view of the device engaged in scribing adjacent an arcuate surface;

Figure 10 is a view in elevation illustrating the employment of an extension rod thereby permitting the device to be used to scribe or cut large circles; and Figure 11 is an isometric view of the knife block.

Figure 1:
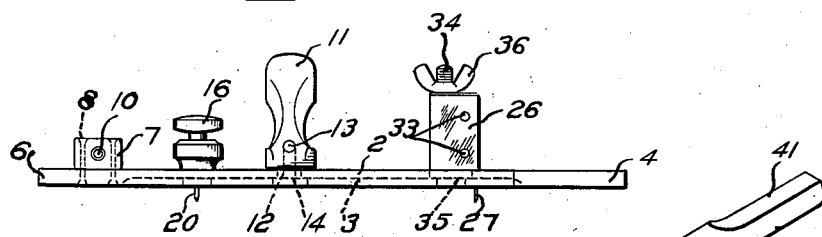

Referring to the drawings, there is shown a frame 2 having a reversed T-slot 3 extending longitudinally thereof. Preferably, the longitudinal ends of the slot 3 are rounded as shown at 3' (Figure 2) to assist ready attachment of various tools to the frame, as will be hereafter explained. One end of the frame 2 terminates in a tapered point 4; the opposite end of the frame 2 terminates in a V-shaped notch 5 providing separate, spaced, tapered points 6. Adjacent one end of the frame 2, preferably the end terminating in the V-shaped notch 5, a connecting block 7 is mounted by rivets 8. It will be appreciated the block 7 is thereby integrally united with the frame 2. An opening 9 extends longitudinally through the block 7 and is adapted to receive an extension rod, as will be explained hereafter. A headless set screw 10 is provided on one side of the block 7 adapted to engage and securely retain an extension rod in the opening 9.

A handle 11 is provided for attachment to the frame 2. The handle 11 is shaped to fit the hand, its fore part terminating in a rectangular block 12 adapted to fit in the T-slot 3. The handle is drilled to provide an opening 13 for the reception of a clamp screw 14. The handle 11 is securely, while removably, attached to the frame 2 by inserting the block 12 into the slot 3 and clamping it to the frame 2 by means of the clamp screw 14.

Figure 3:
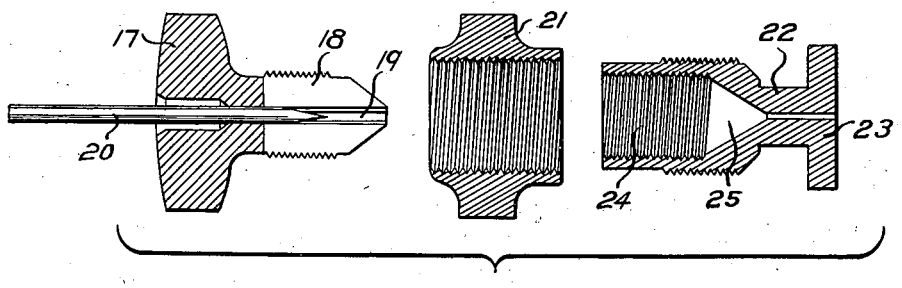
Figure 3 is an exploded sectional view of the scribing pin.

An adjustable scribing pin 16 is removably secured to the frame 2 in spaced relationship to the handle 11 to serve as a center point when our device is used to scribe or cut a circle, and to serve as a scribing point when the device is used to scribe from a plane surface. The scribing pin 16 is secured to the frame in spaced relationship to the points 6 and the point 4 and comprises a knurled finger portion 17 having a depending threaded spindle 18. The finger portion 17 and the spindle 18 are drilled to provide space for a point 20, the spindle 18 being slotted as shown at 19 (Figure 3) to provide clamping means for the point 20, as will be explained hereafter.

The spindle is thus divided in four sections. An interiorly threaded center portion 21, greater in diameter than the width of the T-slot 3, is provided for engagement with an interiorly and exteriorly threaded bottom portion 22 to clamp the pin to the frame 2. The bottom portion 22 has a depending rectangular block 23 adapted to nest in the cross-bar of the reversed T-slot 3. The exterior threads of the bottom portion 22 engage the threads of the center portion 21 thereby securely clamping the frame between the block 23 and the center portion 21 and removably securing the pin to the frame. The opening 24 in the bottom portion 22 terminates in a cone-shaped portion 25 adapted to receive the slotted end of the spindle 18. The point 20 is placed in the finger portion 22 and extends beyond the spindle 18. The interior threads of the bottom portion 22 are adapted to engage with the threads of the spindle 18 so that when the threads are completely in engagement the cone shaped portion 25 engages the end of the spindle 18 forcing the slotted portion of the spindle inwardly to securely hold the point 20. It will be appreciated the position of the point 20 may be readily adjusted vertically by decreasing the amount of engagement between the threads of the spindle 18 and the bottom portion 22 and raising or lowering the point 20, as desired.

A knife holder 26 and blade 27 having cutting edges 28 is provided for attachment to the frame 2 when the device is used primarily for cutting. As best shown in Figure 11, the holder consists of a block 29 having a recess 30 therein extending longitudinally thereof, said recess being in the form of a trapezoid in cross-section, for the reception of the blade 27, shown in dotted lines in Figure 3. An opening is provided extending longitudinally through the block for the reception of attaching means to removably secure it to the frame 2. The block 29 is provided with a slot 32 extending from the recess 30 downwardly and outwardly to an exterior wall of the block. The block 29 is drilled and threaded to provide openings to receive cap screws 33. The blade 27 is placed in the recess 30 with its cutting edges 28 extending beyond the block. By tightening the cap screws 33, the slotted wall of the recess 30 is forced toward its opposite wall thereby securely holding the blade 27 in fixed position. The blade 27 may, of course, be adjusted to any desired position by loosening the cap screws 33 and raising or lowering the blade in the recess. The holder 26 is removably attached to the frame 2 by means of a threaded shaft 34 terminating in a rectangular block 35 adapted to be seated in the T-slot 3, and a wing nut 36 engaging the end of the shaft 34. The shaft 34 is inserted through the T-slot 3 of the frame, the holder 26 placed thereover, the shaft penetrating through the opening therein, and the wing nut 36 tightened thereby clamping the block securely and removably against the frame. Depending upon the particular type of installation being accomplished, for example, if it be desired to cut or scribe parallel lines from a center, a number of holders 26 may be used. The blade 27, preferably, has one blunt end while the other end is sharpened on both sides in order that the blade can cut in either direction when secured in the holder 26 and mounted on the frame 2. When mounted on the frame, both the blade 27 and the point 20 extend through the T-slot in spaced relationship to one another so that the plane including the cutting edges 28 is perpendicular to a line which passes through the blade of the pin and is perpendicular to each of them. This is an important feature of our invention since, by positioning the center pin and the blade in spaced relationship to one another, extremely small circles (in the neighborhood of ¾" diameter) may be cut accurately and quickly without tearing or "chewing" of the floor covering.

It will be appreciated the above described tools can be easily and quickly mounted on the frame and removed therefrom depending upon the diversified uses for which the workman wishes to employ the device. All that is necessary is to loosen—not remove—the attaching means, move the tool along the slot 3 to one of the rounded ends 3' and raise the tool out of engagement with the frame. Any of the various tools may be applied in the same manner, by inserting the clamping means in the rounded end 3', moving it to desired position in the slot 3 and tightening the clamping means.

It will be understood the above described device may be used for many purposes in the installation of linoleum, for example, it may be used to cut or scribe single or multiple circles of various diameters, to scribe or cut lines adjacent a plane surface for the installation of borders, to install "Linostrips," to aid in the formation and installation of complex geometrical designs in floor or wall covering, to install covering in or about recesses in floors, walls, counters and sinks, to scribe or cut lines from an arcuate surface such as the rounded corners of bathtubs, as a seamcutter, and various other purposes which will suggest themselves to one skilled in the art.

Figure 2:
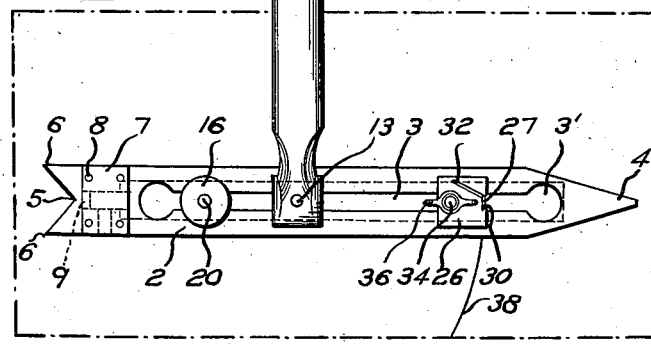
Figure 2 is a plan view of the device in operation cutting a circle.

To aid in the understanding of the multiple uses of our device, we will describe it in use in the installation of linoleum. In Figure 2, our device is being used to cut a circle in a section of floor covering 37, a portion of the scribed or cut circumference being indicated at 38. In this case, the radius of the circle and the desired center is determined, and the pin 16 and blade 27 positioned in spaced relationship. The pin is placed at the desired center and forced in the covering 37 in order that it does not move from such center during the cutting of the circle. The handle 11 is grasped by the workman and the blade 27 drawn or pulled around the center, the frame 2 acting as the beam of a compass, thereby outlining a perfect circle in the covering. When it is desired to transpose disks of differently colored material, the device is transferred to a second section of differently colored covering and the same operation followed, the cut disks being readily and accurately interchangeable. Dependent upon the thickness of the covering, the blade may be drawn a number of times around the circumference rather than attempting to cut the circle by drawing the blade around the circle only a single time. It will be appreciated it is generally more satisfactory to draw the blade around the circumference of the circle a number of times rather than to attempt to cut through the thickness of the material at one time since by so doing, excessive force is not exerted on the blade. If excessive force be exerted on the blade, opportunities for breakage of the blade and "chewing" rather than cutting are increased.

If multiple circles are desired, scribed or cut from the same center, a number of holders 26 and accompanying blades 27 may be mounted on the frame, and placed in spaced relationship to one another, the blades extending through the slot 3 in spaced relationship to one another and the pin 16, so that the planes including their cutting edges are perpendicular to a line which passes through the blades and the pin and are perpendicular to each of them, and the operation carried out as above described. It will be understood while we have described our device as being used to cut a circle, either blades 27 or additional pins 16 may be used interchangeably to cut or scribe a circle, for example, using the word "scribe" to denote marking or scratching a line on the surface of the covering for later cutting.

When our device is used for scribing or cutting from a plane surface, in order to place a border of one color around a field of a second color, the blade 27 or the pin 16 may be used interchangeably. In this case, the pin 16 is positioned on the frame 2 in spaced relationship to the end 4 of the frame, the tapered end 4 placed against the plane surface and the device drawn along the surface with the point 20 scribing or cutting the desired width of border in the field. The field may then be cut along the scribed line and the border inserted therein. If the device be used to cut or scribe adjacent an arcuate surface, the same procedure may be followed using the opposite end 5 of the frame 2. In this case, the tool is in contact with the arcuate surface at separate spaced points thereby eliminating wavering of the point 20 and permitting an accurate line to be scribed or cut. Heretofore, it was practically impossible to cut or scribe an accurate line from an arcuate surface, such as the corner of a built-in bath tub, since the angle of scribing continuously varied, the point being some distance away from the surface, and being necessarily forced to move more rapidly than an edge against the surface. Force applied by the workman to the tool consequently varied and as a result the cut or scribed line was wavy and inaccurate. Our invention obviates such inaccuracies in the cut or scribed lines since it provides continuous engagement with the surface at two separate spaced points and renders it a relatively simple matter to scribe or cut an accurate line.

In many cases, it is desirable to cut circles of greater diameter or to scribe at greater distances than can be accomplished with the device as normally used. For this purpose, we provide extension attachments 39, shown in Figure 4. The attachment 39 comprises a rod 40 having an end 41 shaped to fit in the opening 9 in the block 7 of the frame 2. The opposite end of the rod 40 is inserted within a socket 42 by a force fit. The opposite end of the socket 42 contains an opening 43 adapted to receive further attachments in order to increase the effective length of the device. A headless set screw 44 is provided in the socket to engage any attachment fitted therein to securely hold it in engagement and alignment with the rod. In Figure 10, we have shown an extension rod 40 secured to the frame 2 to increase the effective radius of the device in order to cut large circles. The rod 40 is inserted in the opening in the connecting block 7 and securely held therein by the set screw 10. A pivot pin holder or coupling 45 is provided engaging the socket 42 of the extension rod 39 and securely held thereto by the set screw 44. The scribing or center pin 16 is seated in the holder 45 and secured thereto by clamping the holder between the center portion 21 and the block 23 of the bottom portion 22. It will be understood extension attachments 39 and 45 may likewise be used when the device is used to cut or scribe lines from a plane or arcuate surface. It is not deemed necessary to describe such operation since one skilled in the art may readily determine from the above description the uses of the attachments for such purposes.

In Figures 5, 6 and 7, we have shown a recess scribing tool 46 for attachment to the frame 2 and the method by which it may be used in scribing linoleum to be installed in recesses of floors or walls, in sinks, or on counters. The recess scribing tool 46 comprises a cylindrical rod holder 47 having a drilled opening laterally thereof offset from the center of the cylindrical holder 47 and adapted to receive means to secure it to the frame, and an opening longitudinally thereof adapted to receive a rounded rod 50. The rod 50 tapers at one end to a point 51, the other end of the rod being slightly flattened and terminating in a downwardly directed flange 52. A cap screw 53 and a wing nut 54 are provided to secure the rod in the holder and the holder to the frame. An opening is drilled in the cap screw 53 sufficiently large to permit the rod 50 to pass therethrough.

In assembling the tool 46, the cap screw 53 is placed in the lateral opening in the holder 47, the opening therein being in line with the longitudinal opening in the holder 47, and the rod 50 inserted therein as shown in Figures 6 and 7. The tool 46 is secured adjacent the bottom of the frame 2 and the cap screw 53 is placed in the lateral opening in the holder 47, the opening therein being in line with the longitudinal opening in the holder 47, and the rod 50 inserted therein as shown in Figures 6 and 7. The tool 46 is secured adjacent the bottom of the frame 2 and the cap screw 53 passes upwardly through the slot 3 in the frame 2. The wing nut 54 is attached thereto and removably clamps the frame 2 between it and the holder 47, securely holding the tool in engagement with the frame.

To illustrate the operation of the device, in Figure 6, we have shown the tool 46 being used to scribe surface coverings for installation on counters having plane surfaces normal to one another. The tool 46 is secured to the frame 2 as above described with the end 51 of the rod 50 in spaced relationship to the point 20 of the pin 16 so that a line drawn axially through said pin is normal to a line drawn axially through said rod. The tapered end 51 is then placed against the perpendicular surface of a counter 55, the covering 37 to be installed resting on the horizontal surface of the counter; space, of course, exists between the rod 50 and the frame 2 into which the portion of the covering to be eventually cut off may extend. An accurate line is scribed in the covering merely by running the device along the perpendicular side of the counter, the rounded end 51 being in contact therewith, and cutting off the portion of the covering extending beyond the scribed line.

In Figure 7, we have illustrated the opposite end 52 of the rod 50 as used to scribe a covering to be secured in a recessed surface 56, such as a sink. In this case, the point 20 of the pin 16 is likewise positioned in spaced relationship to the flange 52 so that a line drawn axially through said pin is normal to a line drawn axially through the rod 50, and the flange 52 hooked over the upstanding portion 57 of the sink 56. The covering 37 rests on the horizontal surface of the sink 56 and may extend between the frame 2 and the rod 50. A line may be scribed merely by moving the device along the side of the sink. To fit the covering 37 in the recess, the portion of the covering extending beyond the scribed line is cut off.

When it is necessary to scribe or cut lines in a floor covering for the installation of borders or similar uses some distance away from an arcuate surface, but necessarily having a similar contour, it will be appreciated the end 5 of the frame 2 is difficultly usable, and may not be satisfactory since at great distances from the arcuate surface insufficient space may be provided between the spaced points 6 to afford satisfactory engagement with the arcuate surface to eliminate inaccuracies in the scribed line. Consequently, we provide a tool 58, shown in Figure 8, for such purpose. Preferably, the tool 58 is used with one or more extension rods 39. The tool comprises a forked bar 59 having the forked portions bent outwardly to form legs 60. The end of the bar 59 is shaped to fit within the opening 43 of an extension rod 39. Preferably, the ends of the legs 60 are rounded to avoid sharp edges. The operation of the device is simple. The tool 58 is secured to the frame 2 or to an extension rod 39 as illustrated in Figure 9, in spaced relationship to the pin 16. The legs 60 are placed against the arcuate surface 61, providing engagement at more than one point with such surface, and the device moved around the surface thereby scribing or cutting a covering the required distance from the arcuate surface 61 and of substantially the same contour as such surface. It will be appreciated use of the tool 58 eliminates any possibility of wavering or slipping of the device in use and permits clean, accurate lines to be scribed.

The many advantages of our invention are readily apparent. An economical, efficient, easily operable device is provided which can be used for all the various scribing and cutting duties involved in the installation of hard surface coverings on floors, walls, counters, in recesses or similar uses. The device may be used to cut or scribe circles as small as 3/4" in diameter. It provides satisfactory means for scribing or cutting adjacent arcuate surfaces and obviates wavy or inaccurate borders. It permits surface coverings such as linoleum, Linowall, rubber covering, felt base and the like to be quickly, easily and accurately installed in sink recesses, on counters, or the like. It obviates the disadvantages residing in the necessity of carrying many various tools to be used in different portions of the work of installation since it may be used for all of the diversified scribing and cutting duties required in installing hard surface coverings in varied and complex designs. It is economical in cost and saves large sums by the elimination of the many and varied tools and accessories heretofore required in the installation of floor covering.

The terms "scribing" and "cutting" as used herein have been generally used interchangeably since lines may be scribed with the knife blade or blades as well as with the point of the scribing pin and the lines scribed by the scribing pin may be later cut by a knife.

While we have described and illustrated a preferred embodiment of our invention, it will be understood our invention is not limited thereto since it may be otherwise embodied within the scope of the following claims.

We claim:

1. A scribing device adapted for use in laying surface coverings comprising a frame having an opening extending longitudinally thereof, one end of said frame terminating in two spaced points adapted to be placed against an arcuate surface from which a line is to be scribed having substantially the same contour as such surface, and an adjustable scribing pin mounted on said frame, said pin including a finger portion having a depending threaded spindle, a point in said spindle extending through the opening in said frame, an interiorly threaded center portion, and an interiorly and exteriorly threaded bottom portion, the interior threads of said bottom portion engaging the threaded spindle, the exterior threads of said bottom portion engaging the threads of said center portion thereby clamping the frame between the bottom portion and the center portion and removably securing the pin to the frame.

2. A scribing device adapted for use in laying surface coverings comprising a rectangular frame having a T-slot extending longitudinally thereof, one end of said frame terminating in a point adapted to be placed against a plane surface from which a line is to be scribed, the opposite end of said frame terminating in two spaced points adapted to be placed against an arcuate surface from which a line is to be scribed having substantially the same contour as such surface, and an adjustable scribing pin mounted on said frame, said pin including a finger portion having a depending threaded spindle, a point in said spindle extending through the T-slot in said frame, an interiorly threaded center portion greater in width than the T-slot in the frame and being adapted to engage with a bottom portion to clamp the pin to said frame, and an interiorly and exteriorly threaded bottom portion having a depending rectangular block adapted to nest in the lower portion of the T-slot, the interior threads of said bottom portion engaging the threaded spindle, the exterior threads of said bottom portion engaging the threads of said center portion thereby clamping the frame between said block and said center portion and removably attaching the pin to the frame.

3. In combination with a scribing device having a frame with a T-slot extending longitudinally thereof, a scribing pin comprising a knurled finger portion having a depending threaded spindle, said spindle being slotted at its lower end, a point extending from said spindle, an interiorly threaded center portion greater in width than the T-slot in the frame and being adapted to engage with a bottom portion to clamp the pin to said frame, and an interiorly and exteriorly threaded bottom portion having a depending rectangular block adapted to rest in the lower portion of the T-slot, the interior threads of said bottom portion engaging the threaded spindle thereby forcing said slotted portion inwardly to securely hold said point, the exterior threads of said bottom portion engaging the threads of said center portion thereby clamping the frame between said block and said center portion and removably attaching the pin to the frame.

4. A blade holder adapted for use with a cutting or scribing device having a frame with an opening extending longitudinally thereof, comprising a block having a recess therein adapted to receive a blade, the recess having a trapezoidal form in cross section, said block having a slot therein to permit a wall of the recess to be forced toward the opposite wall of the recess to clamp the blade therebetween, adjustable means adapted to clamp the blade in predetermined position in said recess, and means extending through the opening in the frame to secure the block to the frame.

5. A scribing or cutting device adapted for use in laying surface coverings comprising a frame having an extension block integral therewith, a scribing pin mounted on said frame, an extension rod securely held in said block, a socket on the opposite end of said held extension rod adapted to receive a second rod, a rod seated in said socket, said rod terminating in two separate rounded legs, said legs being curved outwardly in opposite directions and being adapted to be placed against an arcuate surface from which a line is to be scribed or cut thereby affording engagement at more than one point with such surface and means securely holding said rod in spaced relationship to said pin.

6. A scribing device adapted for use in laying surface coverings comprising a frame having an opening extending longitudinally thereof, one end of said frame terminating in a point adapted to be placed against a plane surface from which a line is to be scribed having substantially the same contour as such surface, a scribing pin mounted on said frame, said pin including an upper portion, a point held in said upper portion extending through the opening in said frame, a central portion, and a bottom portion, said bottom portion being adapted to engage the upper portion to securely retain the pin in fixed position therein and being adapted to engage the central portion to clamp the frame between the bottom portion and the central portion thus removably securing the pin to the frame, a handle terminating in a portion adapted to fit within the opening in the frame, and means adapted to engage and to removably secure said handle to said frame, in spaced relationship to said pin.

7. A scribing device adapted for use in laying surface coverings comprising a frame having an opening extending longitudinally thereof, an adjustable scribing pin, means securing said pin to said frame, a rod holder having a longitudinal opening positioned below said frame, a rod placed in the opening in said rod holder and extending longitudinally of the frame, said rod having a rounded end adapted to be placed against a perpendicular surface outlining a line to be scribed, rod holding means placed in said rod holder and extending upwardly therefrom through the opening in said frame, and locking means engaging said rod holding means to clamp the frame between the rod holder and the locking means, thereby securing said rod to said frame in spaced relationship to said pin so that a line drawn axially through said pin is normal to a line drawn axially through said rod.

8. A scribing device adapted for use in laying surface coverings comprising a frame having an opening extending longitudinally thereof, an adjustable scribing pin, means securing said pin to said frame, a rod holder having a longitudinal opening positioned below said frame, a rod placed in the opening in said rod holder and extending longitudinally of the frame, said rod having an end thereof terminating in a downwardly extending flange adapted to rest against an interior wall of a recess to define a line to be scribed, rod holding means placed in said rod holder and extending upwardly therefrom through the opening in said frame, and locking means engaging said rod holding means to clamp the frame between the rod holder and the locking means thereby securing said rod to said frame in spaced relationship to said pin so that a line drawn axially through said pin is normal to a line drawn axially through said rod.

9. A scribing device adapted for use in laying surface coverings comprising a frame having an opening extending longitudinally thereof, an adjustable scribing pin extending through said opening, means securing said pin in position on the frame, a cylindrical rod holder having an opening longitudinally thereof positioned below said frame, a cap screw placed in said holder and extending upwardly therefrom through the opening in said frame, said cap screw having an opening therein in alignment with the longitudinal opening in said rod holder, a rod placed in the opening in said rod holder passing through the opening in said cap screw and extending longitudinally of said frame, said rod having a rounded end adapted to be placed against a perpendicular surface defining a line to be scribed, the opposite end of the rod terminating in a downwardly extending flange adapted to rest against an interior wall of a recess to define a line to be scribed, and means adapted to engage said cap screw to secure the rod to the frame.

HOWARD V. NEISS.
WALTER E. ETTER.